US008640024B2

(12) United States Patent  (10) Patent No.: US 8,640,024 B2
Mitchell  (45) Date of Patent: Jan. 28, 2014

(54) VISUALLY DISTINCT TEXT FORMATTING

(75) Inventor: Ashley Alonzo Mitchell, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 1607 days.

(21) Appl. No.: 11/981,210

(22) Filed: Oct. 30, 2007

(65) Prior Publication Data

US 2013/0124962 A1    May 16, 2013

(51) Int. Cl.
*G06F 17/00* (2006.01)
(52) U.S. Cl.
USPC ............ 715/234; 715/229; 715/230; 715/205
(58) Field of Classification Search
USPC .................. 715/234, 205, 229, 230
See application file for complete search history.

(56) References Cited

U.S. PATENT DOCUMENTS

| | | | | |
|---|---|---|---|---|
| 5,406,640 | A * | 4/1995 | Fitzpatrick et al. | 381/11 |
| 5,619,708 | A * | 4/1997 | Ho | 715/224 |
| 6,169,607 | B1 * | 1/2001 | Harrington | 358/1.9 |
| 6,181,353 | B1 * | 1/2001 | Kurisu | 345/537 |
| 6,195,078 | B1 * | 2/2001 | Dinwiddie et al. | 345/636 |
| 6,324,555 | B1 | 11/2001 | Sites | |
| 6,658,626 | B1 | 12/2003 | Aiken | |
| 6,714,322 | B1 * | 3/2004 | Minamino | 358/3.06 |
| 6,845,488 | B1 * | 1/2005 | Shim et al. | 715/815 |
| 7,260,773 | B2 * | 8/2007 | Zernik | 715/229 |
| 2002/0159636 | A1 * | 10/2002 | Lienhart et al. | 382/176 |
| 2003/0140097 | A1 * | 7/2003 | Schloer | 709/203 |
| 2003/0152293 | A1 * | 8/2003 | Bresler et al. | 382/305 |
| 2004/0109181 | A1 * | 6/2004 | Suzuki | 358/1.9 |
| 2004/0223648 | A1 | 11/2004 | Hoene et al. | |
| 2004/0227660 | A1 * | 11/2004 | Scott | 342/26 R |
| 2004/0247155 | A1 * | 12/2004 | Eguchi | 382/100 |
| 2005/0010863 | A1 * | 1/2005 | Zernik | 715/511 |
| 2005/0091499 | A1 | 4/2005 | Forlenza et al. | |
| 2005/0246526 | A1 | 11/2005 | Forlenza et al. | |
| 2006/0001690 | A1 * | 1/2006 | Martinez et al. | 347/19 |
| 2006/0044324 | A1 * | 3/2006 | Shum et al. | 345/595 |
| 2006/0048046 | A1 | 3/2006 | Joshi et al. | |
| 2007/0050419 | A1 * | 3/2007 | Weyl et al. | 707/200 |
| 2007/0129978 | A1 * | 6/2007 | Shirasu et al. | 705/7 |
| 2007/0162840 | A1 * | 7/2007 | Rochelle et al. | 715/505 |
| 2007/0168877 | A1 * | 7/2007 | Jain et al. | 715/772 |
| 2007/0277093 | A1 | 11/2007 | Joshi et al. | |
| 2008/0088935 | A1 * | 4/2008 | Daly | 359/613 |
| 2008/0095442 | A1 * | 4/2008 | Ekin et al. | 382/187 |

* cited by examiner

Primary Examiner — Nathan Hillery
(74) Attorney, Agent, or Firm — Wolfe-SBMC

(57) ABSTRACT

Techniques for visually distinct text formatting are described, including receiving an input, the input indicating presenting text visually distinct based on one or more differences in formatting associated with the text, evaluating a document including the text, the text being formatted according to one or more font attributes, the one or more differences being associated with the one or more font attributes, and identifying the one or more differences, wherein the one or more differences are displayed in the document by applying one or more backgrounds associated with each of the one or more font attributes to the text.

18 Claims, 6 Drawing Sheets

VISUALLY DISTINCT TEXT FORMATTING

FIELD OF THE INVENTION

Embodiments relate generally to software and user interfaces. More specifically, techniques for visually distinct text formatting are described.

BACKGROUND OF THE INVENTION

Before publishing or printing a document, users must identify and verify that text in the document is correctly formatted. Using conventional techniques, identification and verification of text formatting require substantial user effort and time. A standard, letter-sized page can easily have hundreds of words and thousands of characters. A multiple-page newspaper, publication, or book can have tens of thousands of words and hundreds of thousands of characters. To verify text formatting on a multi-page newspaper, a newspaper publisher typically needs to employ multiple people (e.g., copy editors, writers, and the like) to review the text of a newspaper, character by character.

Using conventional copy-editing techniques, including manual reviewing, does not ensure that text formatting is completely identified and correctly applied. Conventional techniques used to identify text formatting are time consuming and inaccurate. For example, a user must scrutinize text checking individual words, or even individual characters with the user's own eyes. Typical text formatting verification tasks include manual checking to ensure text in some portions of a document are set or formatted to one font, in a certain font size (e.g., Arial font, size 10), manual checking to ensure text in other portions of a document are formatted to another font, in a certain font size (e.g., Arial font, size 8), manual checking to ensure headlines are formatted with a desired style (e.g., bold, size 14), or manual checking to ensure foreign language words are italicized. Regardless of the types of formatting verification, conventional applications typically require manual and labor-intensive checking, which does not ensure that text formatting is identified and correctly applied.

Other problems associated with conventional techniques involve the existence of numerous fonts, font sizes, and font styles and their numerous formatting differences. Some formatting differences are subtle and difficult to detect. For example, the difference between a 6-point, italic footnote number and a 6-point, non-italic footnote number is very subtle and difficult to detect. Likewise, there is often difficulty locating a character, word, or sentence that is formatted differently than surrounding text. For example, text set to a different font (e.g., Verdana) or a different font size (e.g., 9 point) on a tabloid-sized page of 10-point, Arial text is difficult to detect. These subtle differences often go unnoticed in an editing process or remain undiscovered until after a document has been printed, at which time correcting such errors can be impossible or expensive.

Thus, a solution for identifying text formatting without the limitations of conventional techniques is needed.

BRIEF DESCRIPTION OF THE FIGURES

Various examples are disclosed in the following detailed description and the accompanying drawings.

DETAILED DESCRIPTION

Figure 1A:
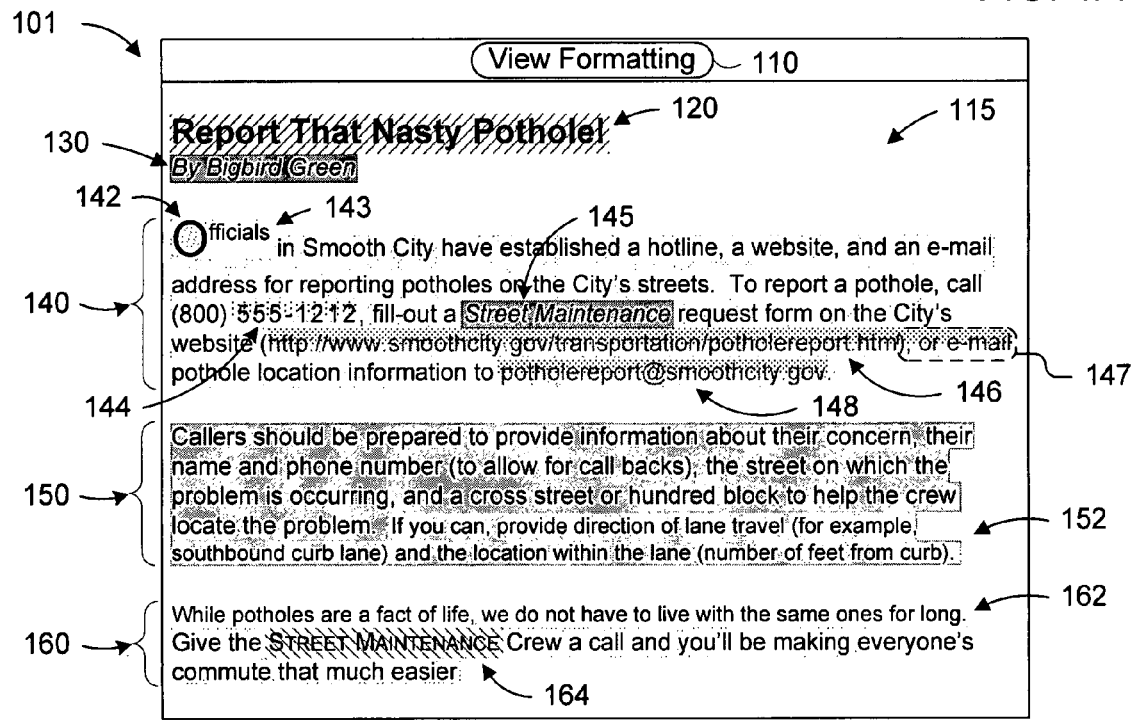
FIG. 1A illustrates exemplary techniques for visually distinct text formatting.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Various examples of visually distinct text formatting are described, including showing differently-formatted text in different or distinctive foregrounds, backgrounds, or other visual marks. Devices, computing systems, user interfaces, processes, methods, and programming instructions that implement various techniques for visually distinct text formatting are also described. These and other techniques may be implemented in any media, including electronic media (e.g., an electronic display or computer memory), printed media (e.g., paper), and transmission media (e.g., facsimile or network transmission). Various techniques for visually distinct text formatting may be selectively applied or toggled on and off. Likewise, various techniques may be selectively applied to one or more portions of a document or to the entire document or file. In other examples, different techniques may be implemented differently and are not limited to the examples provided and described.

FIG. 1A illustrates exemplary techniques for visually distinct text formatting. Here, display 101, which is illustrated with a control 110, is showing document 115 with text formatting shown visually. Document 115 includes, for example, a headline 120, author byline 130, and three body paragraphs 140, 150, and 160. Paragraph 140 includes, for example, portions of text 142-148 that may be formatted differently from paragraph 140. Likewise, for example, text 152 may be applied a different format from that of paragraph 150. Text 162 and 164 may be formatted differently from paragraph 160.

Figure 1B:
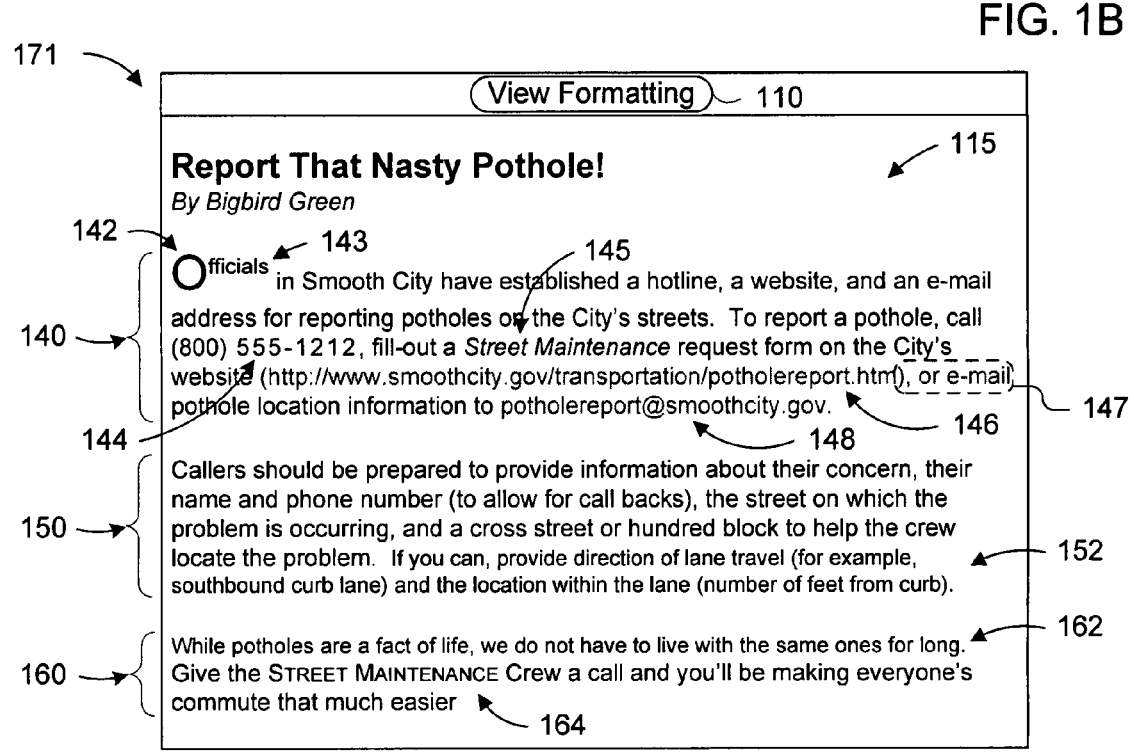
FIG. 1B illustrates further exemplary techniques for visually distinct text formatting.

FIG. 1B illustrates further exemplary techniques for visually distinct text formatting. Display 171 shows the same document 115 (as in FIG. 1A) without visually distinct text formatting. As an example, document 115 may be of any length (e.g., any number of characters, words, lines, paragraphs, or pages, such as one page, a few pages, or tens, hundreds, thousands, or more pages). In some examples, document 115 may be shown on a printed medium (e.g., paper) or other media. Here, for illustration purposes, text in document 115 is shown in English. However, various techniques of visually distinct text formatting may be applied to text in any language that can be set or formatted to more than one font format.

As used herein, in some examples, the terms "font format," "text format," or "format" with respect to text or font refer generally to any one or more font attributes. A "font attribute" refers to any characteristic, property, or feature of a font or typeface. Examples of font attributes include typeface (e.g., a font or font name, such as Arial, Courier, or Times New Roman); font size (e.g., 10 point or 12 point); font scale (e.g., 75% or 110%); font weight (e.g., normal, narrow, medium, or bold); font style (e.g., italic, roman, oblique, calligraphy, expanded, condensed, or compressed); font case (e.g., all caps, initial caps, or small caps); position (e.g., subscript or superscript); font color; spacing (e.g., leading, tracking, word spacing, character spacing, line spacing, or kerning); justification (e.g., left, centered, or right); modification (e.g., underline or strikethrough); and other font properties. A font format may be applied to text of any length, such as a character or a range of characters that span one or more words, lines, paragraphs, or pages. In some examples, text in different portions of a document may be set to different font formats. For example, two font formats may be different if they have at least one font attribute difference.

Text formatting may be shown, for example, upon receiving an input, for example, from a control, such as control 110. As used herein, the term "control" refers generally to any input interface or mechanism. A control may be physically implemented (e.g., a key, button, mouse, trackball, touch screen, tablet, lever, switch, pen, and others) or virtually implemented, such as a graphical user interface control (e.g., a pointer, icon, button, checkbox, list box, menu selection, or another type of element). In some examples, a control may be activated with a single action, such as a single click or keystroke. In other examples, activating a control may be performed with two or more actions (e.g., two or more keystrokes, clicks, or combination). Some examples may include fewer controls than shown or additional controls beyond those shown in FIG. 1.

Here, text in document 115 is set to a number of font formats to illustrate various examples of visually distinct text formatting. However, techniques for visually distinct text formatting are not limited to the examples shown and described. Upon activating, for example, control 110, portions of text in different font formats are distinctively shown or otherwise indicated. For example, headline 120 is set to a certain font format (e.g., WarnockPro font, 14-point, and bold). In display 101 (FIG. 1A), text with this font format may be shown, for example, with a different or distinctive foreground, background, or both ("distinctive mark"), such as a background with diagonal-parallel hatching lines. In some examples, a distinctive foreground refers to text in a distinct color or gray value (collectively, "color"), pattern, combination of color and pattern, or the like. A distinctive background refers the background of text (e.g., the space behind the text) in a distinct color, pattern, combination of color and pattern, or the like.

Referring to FIG. 1A, display 101 shows document 115 having each font format distinctively shown with a different mark. Here, for example, no other text in document 115 is set to the same font format as the text in headline 120; thus, the same distinctive mark used to show headline 120 is not used elsewhere in document 115. In other examples, two or more font formats may share one distinctive mark as long as no two adjacent portions of text in different font formats are shown in the same distinctive mark. For example (not shown), two portions of non-adjacent text set to two different font formats may be shown with the same distinctive mark.

Author byline 130 is set to another font format (e.g., Arial font, 10-point, italic). In display 101, text in this font format may be distinctively shown, for example, with a background in a certain color. Paragraph 140 may be set to a third font format (e.g., Arial font, 10-point, normal). Text in this font format may be distinctively shown, for example, with a light gray or color background. Within a paragraph, there may be portions of text set to different font formats, such as text portions 142-148.

The differently-formatted text 142-148 may be shown, for example, with different distinctive marks. Here, text "O" 142, illustrated in 20-point, Arial font, is associated and shown with a distinctive patterned background. Text "fficials" 143, illustrated in superscripted, 14-point, Arial font, is associated and shown with a distinctive two-tone, patterned background. Text "555-1212" 144 is formatted, for example, with a wider space between characters, and the font format is illustrated with another distinctive two-tone, patterned background. With different font formats shown in different distinctive marks, a user can identify and verify text in different formatting.

Likewise, with text set to an identical font format shown with an identical mark, a user can identify and verify text with the identical font format. Here, text "Street Maintenance" 145 is set, for example, to the same font format (e.g., Arial font, 10-point, italic) as the text in author byline 130; thus, text "Street Maintenance" 145 and author byline 130 are associated and shown with an identical mark. Using a visual mark allows a user to identify whether text "Street Maintenance" 145 has been inadvertently set to an italic font format to make the appropriate formatting corrections.

Here, at the end of paragraph 140, a website address 146, a portion of text ") or e-mail" 147, and an e-mail address 148 are set to, for example, a predefined font format for hyperlinks. A predefined font format may be one that includes a set of pre-selected font attributes. For example, a predefined font format for hyperlinks may include a pre-selected font color attribute set to gray or blue. There may be another font format labeled "Heading 1," for example, predefined with a set of font attributes, such as 14-point font size, bold weight, and Times New Roman font. In some examples, there may be one or more predefined font formats. In other examples, there may be no predefined font format.

In some examples, over-applying a font format may be identified with font formatting distinctively shown. Here, text set to the hyperlink font format is shown with, for example, another distinctive background. A hyperlink font format may have been overly applied to text ") or e-mail" 147. In display 171 (FIG. 1B), where font formatting is not distinctively shown, text ") or e-mail" 147 blends in with the surrounding text, and the over-application mistake may not be obvious. However, in display 101 (FIG. 1A), where font formatting is distinctively shown, text ") or e-mail" 147 stands out from the surrounding text and background in order to attract a user's attention, and the over-application of the hyperlink font format is likely to be identified and corrected. Likewise, other accidental applications of font formats (e.g., under application) may attract a user's attention and, using the described techniques, be identified and corrected.

As another example, text in paragraph 150 may be set to, for example, 10-point, WarnockPro font. The last sentence 152 of paragraph 150 may be set to another font format (e.g., a smaller sized, 9-point, WarnockPro font). In display 101 (FIG. 1A), the two font formats are shown with two distinctive marks (e.g., backgrounds in different colors or gray values). Likewise, paragraph 160, sentence 162, and text "Street Maintenance" 164 are illustrated with different font formats and are shown with different distinctive backgrounds. For example, paragraph 160 may be formatted in 10-point, Arial font and sentence 162 may be set to 9-point, Arial font. The font size difference, as shown in display 171 (FIG. 1B), may not be readily distinguishable to human eyes. In display 101 (FIG. 1A), however, the font size difference, even with just one point difference, may be clearly and distinctively marked with, for example, colored or gray backgrounds.

Here, text "Street Maintenance" 164 is illustrated with a small-caps font format and may be shown, for example, with a patterned background. With text in different font formats clearly and distinctively shown, as in display 101 (FIG. 1A), users can identify different formatting with less effort. For example, the same text "Street Maintenance" 164 and "Street Maintenance" 145 are illustrated with different font formats. Without visually showing font formatting, the formatting differences are not readily identifiable, as in display 171 (FIG. 1B). When text "Street Maintenance" 145 and "Street Maintenance" 164 are visually and distinctively marked, as in display 101 (FIG. 1A), the formatting differences are readily identifiable. If the formatting differences are accidental, a user may be more likely to make the appropriate formatting corrections using visual marks.

In some examples, such as paragraph 140, more than one font format may be applied to some text. For example, a paragraph-level font format (e.g., indent) may be applied to paragraph 140 and another character-level font format (e.g., italic or hyperlink) may be applied to some text within paragraph 140 (e.g., text 142-148). Paragraph-level font formats may be any font formats. In some examples, paragraph-level font formats may include additional font formats, such as indent, first-line indent, outdent, extent, block indent, hanging indent, bullet, drop cap, raise cap, and others. There may be different "levels" of font formats in some examples, such a page-level and a regional-level font formats. Further, font formats may be varied and are not limited to the examples provided.

In some examples, display 101 (FIG. 1A), paragraph 140 is set to, for example, a paragraph-level font format of 10-point, Arial font. Portions of text 142-148 within paragraph 140 may be set to different character-level font formats. When a control (e.g., control 110) is activated, text in paragraph 140 may be shown, for example, with a lighter gray background. In some examples, portions of text 142-148 may be distinctively shown in marks different from the mark for the paragraph-level font format. For illustration, text 142, 143, and 145 are shown with marks different from a lighter gray background (i.e., for the paragraph-level font format). In other examples, such as with text 144, 146-148, text set to character-level font formats may be distinctively shown in marks that combine a lighter gray background (i.e., for the paragraph-level font format). For example, text 144, 146-148 are shown with a lighter gray background (i.e., for the paragraph-level font format) in the lower part of the background and distinctive patterned marks for the character-level font formats in the upper part of the background.

In some examples, text with two or more font formats (e.g., character-level, paragraph-level, page-level, and regional-level font formats) may be shown differently from the above-described examples. For example, text may be shown in a distinctive foreground, background, or both, having two or more colors, patterns, or combination of colors and patterns.

In FIG. 1A, display 101 illustrates that text is distinctively shown when a control is activated or an input is received to turn on showing of text formatting. In some examples, a user may turn on showing of text formatting to a segment or portion of a document. For example, a portion of a document may be a visible portion (e.g., the portion shown on a screen or in a display), a printed portion, or a selected portion. A portion of a document may be identified or selected by any techniques, tools, or implementations. For example, a user may identify or select a portion of a document with known boundaries, such as a paragraph, page, or table, by placing a cursor or pointer (e.g., mouse pointer) anywhere in the portion. As another example, a portion of a document may be selected or identified by highlighting the portion. A portion of a document may be a region of a document, such as the header or footer, which may be selected or identified upon entering. Portions of a document may be identified or selected differently in other examples. The above-described portion identification or selection techniques may be varied in design, implementation, or other aspects, and are not limited to the examples shown and described.

In some examples, showing of text formatting may be turned on and turned off at any time. Showing text formatting may be toggled or turned on and off using various techniques, such as selecting an item from a menu or sub-menu; selecting a control, widget, or icon; or pressing a key or a combination of keys on a keyboard. For example, from an off state (i.e., text formatting is visually suppressed or not shown) as in display 171 (FIG. 1B), text formatting may be turned on and shown by activating a key or a control (e.g., control 110). In showing or an on state as in display 101 (FIG. 1A), text formatting is shown and text may be operated upon as usual (e.g., performed various copy-editing tasks). For example, text may be added, deleted, modified, moved, printed, or reformatted with another font format or different font attributes (e.g., set to italic). In some examples, when text is set to a different font format in an "on state," a different font format may be shown automatically, semi-automatically, or manually based on prompting a user for input. Text formatting ceases to show when the feature is turned off or suppressed, for example, by activating a key or a control (e.g., control 110). In some examples, text formatting may be activated or deactivated differently than as described above.

In some examples, a font format may be specified in various places, such as in a device or system, an application, a script, or a file. For example, a system may specify and provide one or more font formats. Likewise, an application may specify and provide one or more font formats. Further, a system, an application, or both may specify or generate any number of distinctive marks to be used to show text with different font formats. For example, a number of distinctive marks may be rotated to show text with different font formats.

In some examples, users may specify one or more font formats in a script, macro, file, application, or on-the-fly (i.e., when needed). Users may also specify or generate distinctive marks or select existing distinctive marks, if available, to be used to show text set to user-specified font formats. For example, a user may specify a font format with a set of font attributes and specify or associate how text set to the font format is to be shown (e.g., with a given background color). In some examples, a user may specify one or more distinctive marks to be used to show text in one or more font formats from a system or application. The user's specifications may be stored in a script to be executed, added to an application, applied after definition, or saved in a file, such as a style sheet (e.g., cascade style sheet).

In some examples, there may be multiple font formats applicable in certain situations or conditions. For example, a system-provided font format (e.g., a default font format), an application-provided font format (e.g., a paragraph-level font format), and a user-specified font format (e.g., in a style sheet file) may be applicable to some text. In some examples where there may be a font format hierarchy, the font format to be applied may follow any precedent. For example, an application-provided font format may take precedence over a system-provided font format. A font format specified by a file (e.g., cascade style sheet) may take precedence over a system-provided font format and an application-provided font format. A user-specified font format (e.g., manually specified on the fly) may also override any font format. In some examples, a chosen font format may have an accompanying or associated mark specified for showing text set to the chosen font format. In other examples, a mark used to show text in a font format may come from a hierarchy of distinctive marks. A hierarchy of distinctive marks may have a similar or different structure or application precedent to the structure of a font format hierarchy. For example, an application may determine the differences between two font formats, select or generate two distinct backgrounds to associate with the two font formats. In other examples, font format selection and distinctive mark selection may be implemented differently from the above-described examples. Not all enumerated features and properties pertaining to font formats, text formatting, editing, printing, displaying, or style sheet are included in the examples provided. In other examples, there may be additional features and properties. For example, there may be selection boxes, toggle buttons, or other input interfaces to control activation, selection, locking, viewing, printing, editing, and other operations. The above-described structures, features, operations, techniques, procedures, and other aspects may be varied in design, implementation, and function and are not limited to the descriptions provided.

Figure 2:
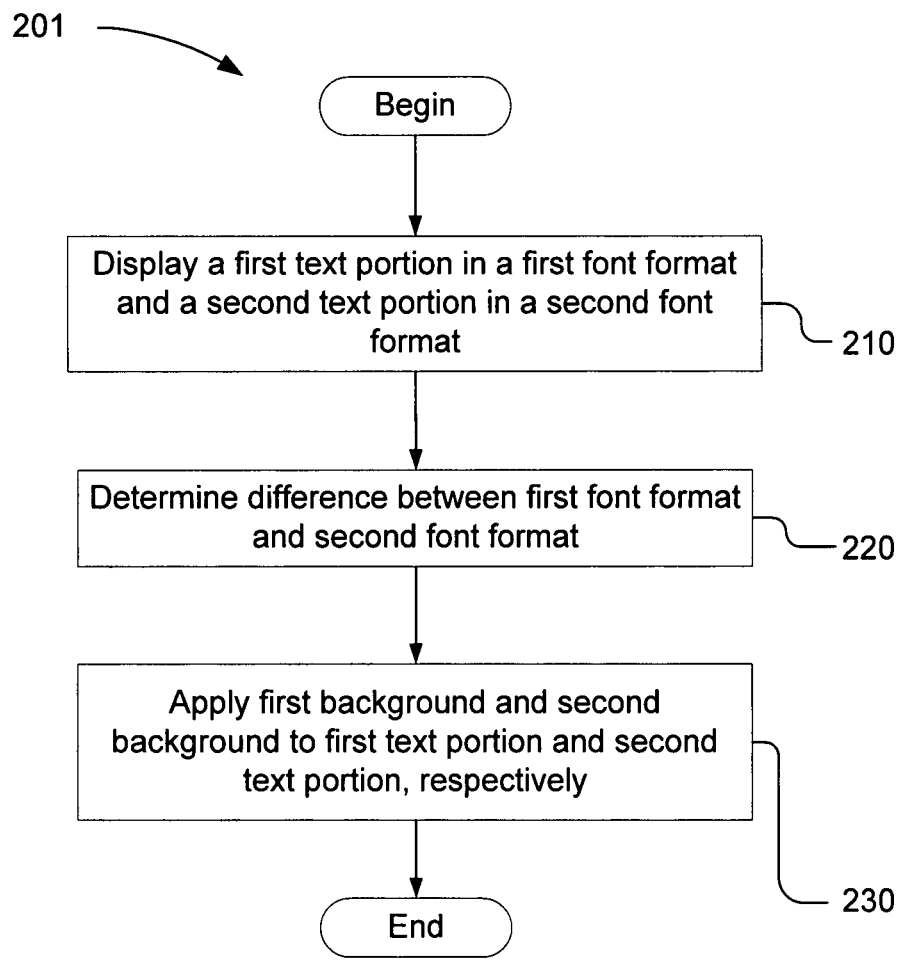
FIG. 2 is a flow diagram of an exemplary process for visually distinct text formatting.

FIG. 2 is a flow diagram of an exemplary process for visually distinct text formatting. Here, process 201 is suitable for implementation as, for example, a computer program code, software instructions, firmware, circuitry, logic, or hardware. In some examples, a first text portion and a second text portion are displayed (210). One or more differences are determined between a first font format associated with the first text portion and a second font format associated with the second text portion (220). Once determined, the differences are highlighted (i.e., marked) by displaying the first text portion using a first text background and a second text portion using a second text background (230).

In some examples, differences (e.g., text differences in font formats, styles, sizes, and the like) may be determined by evaluating text according to one or more font attributes. Based on the determined difference, background highlighting or marking may be implemented in order to allow a user to readily identify differences within the text of a document. In other words, text that is formatted differently according to various font attributes may be made apparent to a user by using, for example, different colored backgrounds, patterns, or the like. For example, if text formatting differences are indicated using a first background and a second background, the differences may be subtle in nature (e.g., a point in font size (e.g., text 150 and 152 in FIG. 1A)). Subsequently, the first and second backgrounds may be generated and displayed as two different shades of gray (i.e., visually distinct or different) or slightly different colors. As another examples, if the difference between a first font attribute and a second font attribute is substantial (e.g., different font styles), then backgrounds of different colors may be used to draw attention to the difference in various portions of a document.

In some examples, the first and second portions of text may be displayed as being visually distinct using distinctive backgrounds (i.e., markings) in response to an input (e.g. user input, system-generated input, user interaction with an on-screen element, icon, control (e.g., control 110 (FIG. 1A), widget, or the like). Thus, backgrounds may be visually distinct in color, pattern s or other attributes. Further, text shown with visually distinct marks may be manipulated (i.e., edited, printed, saved, or the like). Any editing techniques, tools, or applications configured to operate on text may be used. In some examples, the above-described process may be varied in design, order, implementation, or other aspects, and is not limited to the examples shown and described.

Figure 3:
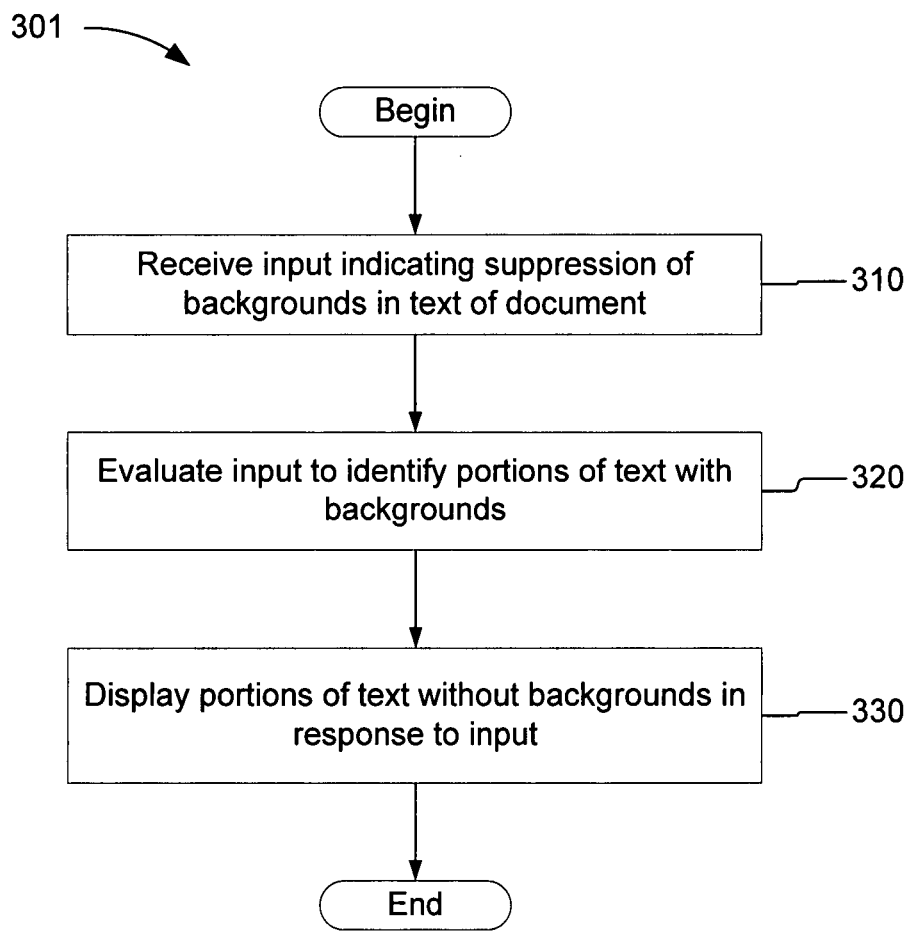
FIG. 3 is a flow diagram of another exemplary process for visually distinct text formatting.

FIG. 3 is a flow diagram of another exemplary process for visually distinct text formatting. Here, an input may be generated (i.e., using a control, such as those described herein) and received indicating suppression (i.e., removing or otherwise not displaying) backgrounds or other markings of text in a document (310). The input may be evaluated to identify portions of text being displayed using backgrounds (320). Once identified, the portions of text being displayed with backgrounds may be displayed without backgrounds (i.e., turning off backgrounds, markings, colors, patterns, or the like) (330). For example, a user may wish to display a portion of text without a background color in order to view the document with a common or consistent background color (e.g., white, transparent, and others). In other examples, process 301 may be varied in design, order, implementation, or other aspects, and is not limited to the examples shown and described.

Figure 4:
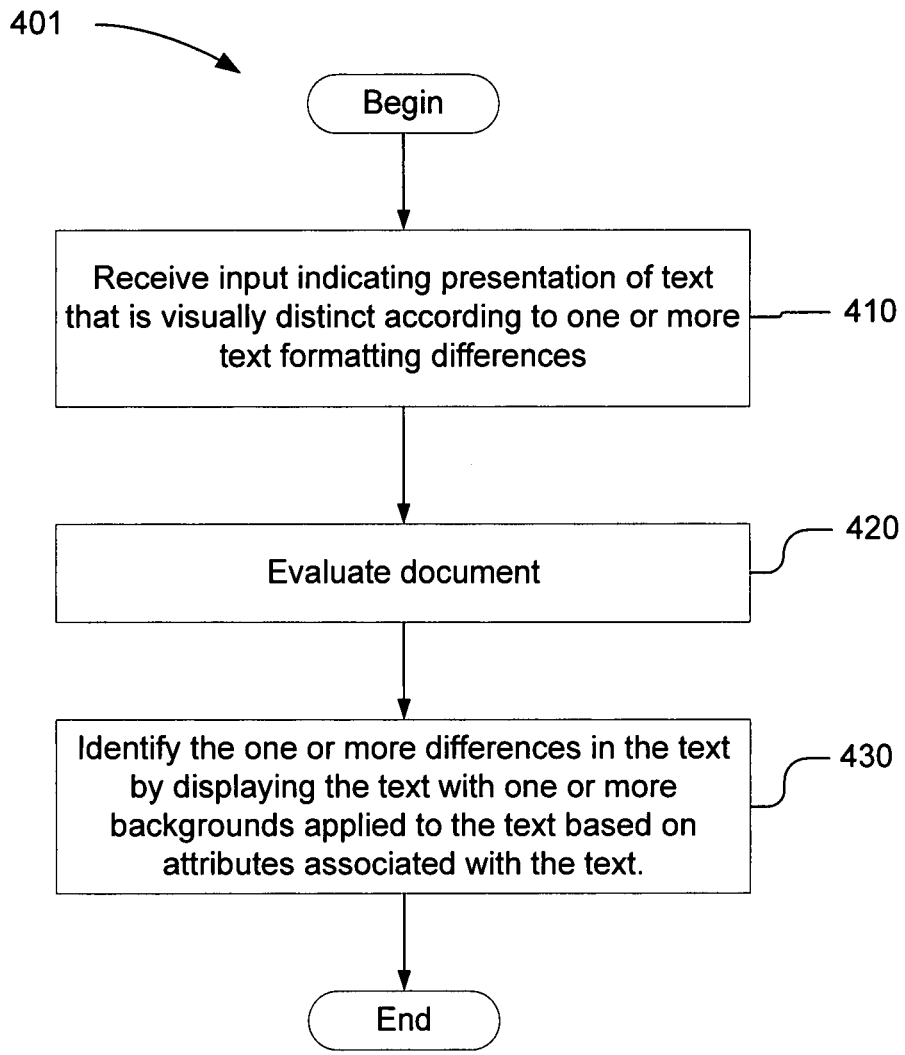
FIG. 4 is a flow diagram of an alternative exemplary process for visually distinct text formatting.

FIG. 4 is a flow diagram of an alternative exemplary process for visually distinct text formatting. Here, an input is received that indicates the presentation (i.e., display) of text in a document according to one or more text formatting differences. (410). The document is evaluated according to the input, identifying text formatting differences between one or more portions of text within the document (420). For example, a text formatting difference (i.e., "difference") may be a portion of the document that is formatted using a font format and another portion that uses a different font format. The locations of portions of text may be substantially adjacent or separated from each other within the document. Once evaluated, the document has backgrounds applied to the text (i.e., text portions of the document) in order to identify text formatting differences (430). For example, text portions may be shown with backgrounds that are visually distinct (i.e., different) in color, pattern, or other characteristics or attributes. Any editing techniques, tools, or applications configured to operate on text may be used. In some examples, the portion of the document may be shown in a display, printed on a printable medium, or otherwise presented. In some examples, the above-described process may be varied in design, order, implementation, or other aspects, and is not limited to the examples shown and described.

Figure 5:
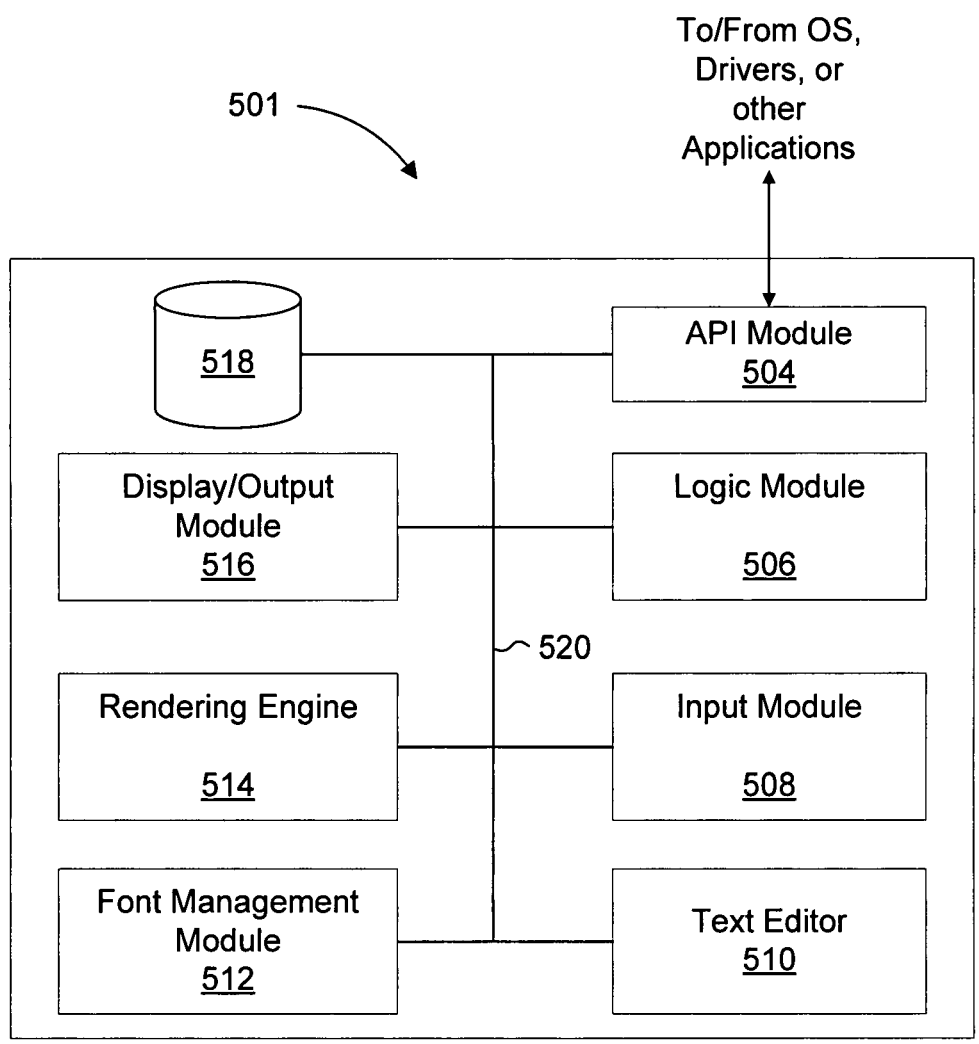
FIG. 5 illustrates an exemplary application architecture for visually distinct text formatting.

FIG. 5 illustrates an exemplary application architecture for visually distinct text formatting. Here, application 501 includes application programming interface ("API") module 504, logic module 506, input module 508, text editor 510, font management module 512, rendering engine 514, display/output module 516, repository 518, and bus 520. In some examples, API module 504, logic module 506, input module 508, text editor 510, font management module 512, rendering engine 514, display/output module 516, and repository 518 may be in data communication with each other, other applications, operating systems, drivers, or the like using bus 520, which may be a logical or physical coupling configured to allow data transfer between processes such as those described. Further, API module 504 may be in data communication with one or more external processes (not shown) using actual or physical ports (not shown), processes, or other data interfaces. Other external processes may include, but are not limited to operating systems ("OS"), drivers (e.g., input/output, disk drive, and graphic circuit drivers), firmware, applications, state machines, virtual state machines, and others.

In some examples, when data is received by API module 504, it may be transferred to one or more other modules (e.g., logic module 506, input module 508, text editor 510, font management module 512, rendering engine 514, display/output module 516, repository 518, and others) using bus 520. For example, after display/output module 516 has displayed one or more portions of a document, API module 504 may receive from an input driver (not shown) input data, for example, to select a portion of the document, activate a control to turn on visual distinct text formatting, specify a font format, or edit some text. The input data may be transferred to input module 508 for interpretation (e.g., determining which control has been activated or which portion of the document has been selected) and transferred to display/output module 516 to display the portion of the document, for example, with text formatting distinctively shown.

In some examples, logic module 506 may be configured to control the data flow through bus 520 and direct the services provided by API module 504, input module 508, text editor 510, font management module 512, rendering engine 514, display/output module 516, and repository 518 in order to implement various techniques for visually distinct text formatting according to various embodiments. For example, a style sheet file and a file with text set to a number of font formats may be stored in repository 518. In response to a control being activated, logic module 506 may direct text editor 510 to retrieve one or more definitions of distinct marks for certain font formats from the cascade style sheet in repository 518, direct rendering engine 514 to render the distinct marks, and direct display/output module 516 to display text in certain font formats with the distinct marks.

Application 501 and the above-described modules and elements may be varied in design, function, configuration, or implementation and are not limited to the descriptions provided above.

Figure 6:
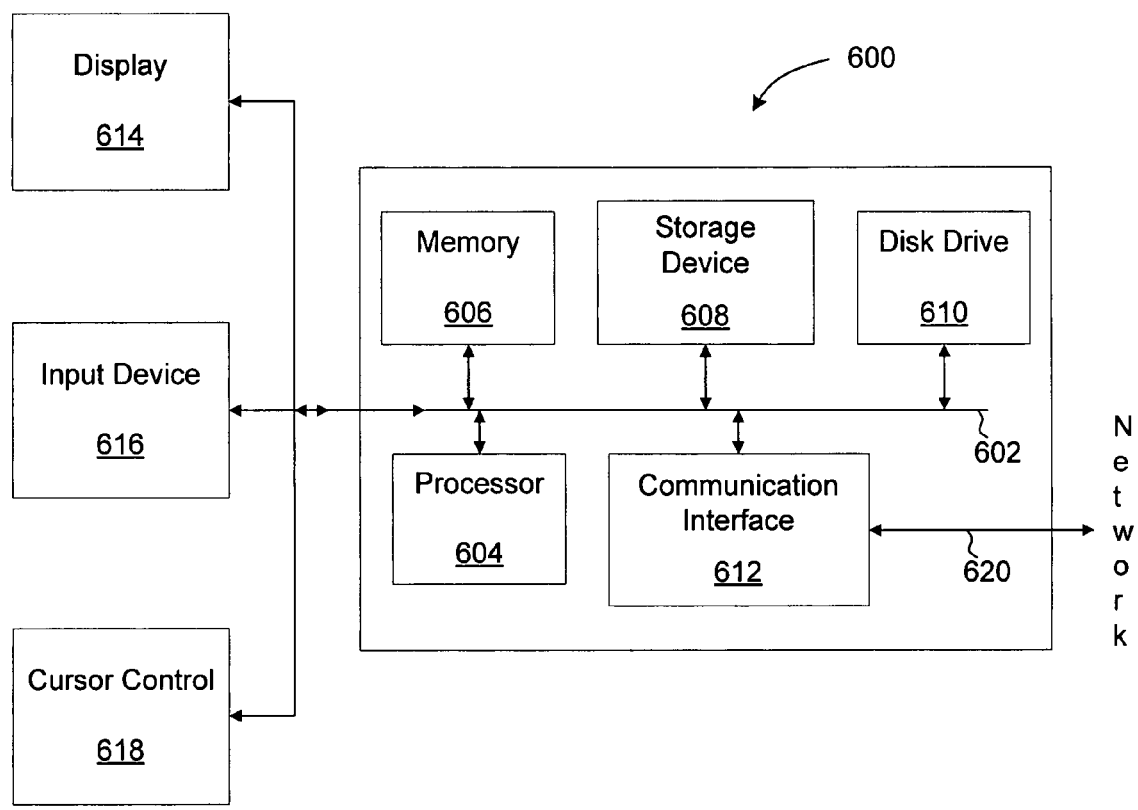
FIG. 6 illustrates an exemplary computer system suitable for deploying visually distinct text formatting.

FIG. 6 illustrates an exemplary computer system suitable for deploying visually distinct text formatting. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball). Processor 604 can be a single-core, dual-core, or multi-core processor; and processor 604 can be a processor in a multi-processor environment or a distributed processing environment.

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
   performing, by a computer:
      displaying a first text portion in a first font format and a second text portion in a second font format,
         wherein the first and second text portions are within a same document;
      determining a difference between the first font format and the second font format, wherein a first background is associated with the first font format and a second background is associated with the second font format, the first background and the second background being generated based on the difference; and applying the first background to the first text portion and the second background to the second text portion in response to an input indicating application of the first background and the second background, the first background and the second background being visually distinct.

2. The method of claim 1, wherein the first text portion is substantially adjacent to the second text portion.

3. The method of claim 1, wherein the first background and the second background being visually distinct further comprises the first background and the second background being substantially different from each other.

4. The method of claim 1, wherein the first font format has a first font attribute and the second font format has a second font attribute, the first font attribute and the second font attribute being substantially different from each other.

5. The method of claim 1, wherein the first background is a first color and the second background is a second color, the first color and the second color being substantially different from each other.

6. The method of claim 1, wherein the first background is a first pattern and the second background is a second pattern, the first pattern and the second pattern being substantially different from each other.

7. The method of claim 1, further comprising:
receiving another input indicating suppression of the first background and the second background; and
displaying the first text portion without the first background and the second text portion without the second background in response to the another input.

8. A system, comprising:
a memory configured to store data associated with a first text portion and a second text portion,
wherein the first and second text portions are within a same document; and
a processor configured to display the first text portion in a first font format and the second text portion in a second font format, to determine a difference between the first font format and the second font format, wherein a first background is associated with the first font format and a second background is associated with the second font format, the first background and the second background being generated based on the difference, and to apply the first background to the first text portion and the second background to the second text portion in response to an input indicating application of the first background and the second background, the first background and the second background being visually distinct.

9. A computer program product embodied in a non-transitory computer-readable medium and comprising computer instructions for:
displaying a first text portion in a first font format and a second text portion in a second font format,
wherein the first and second text portions are within a same document;
determining a difference between the first font format and the second font format, wherein a first background is associated with the first font format and a second background is associated with the second font format, the first background and the second background being generated based on the difference; and applying the first background to the first text portion and the second background to the second text portion in response to an input indicating application of the first background and the second background, the first background and the second background being visually distinct.

10. A method, comprising:
performing, by a computer:
receiving an input, the input indicating presenting text visually distinct based on one or more differences in formatting associated with the text,
wherein all the text with on one or more differences in formatting associated with the text is within a same document;
evaluating the document, the text being formatted according to one or more font attributes, the one or more differences being associated with the one or more font attributes; and
identifying the one or more differences, wherein the one or more differences are displayed in the document by applying one or more backgrounds associated with each of the one or more font attributes to the text.

11. The method of claim 10, further comprising presenting the one or more backgrounds substantially within a portion of the document.

12. The method of claim 10, further comprising receiving another input indicating identification of a portion of the document, the portion of the document being evaluated for the one or more differences.

13. The method of claim 10, wherein the one or more font attributes comprises a font format.

14. The method of claim 10, wherein receiving an input further comprises receiving the input from a control associated with a graphical user interface.

15. The method of claim 10, wherein the one or more differences comprises two or more portions of the text being formatted using substantially different font formats.

16. The method of claim 10, wherein each of the one or more backgrounds comprises a color.

17. The method of claim 10, wherein each of the one or more backgrounds comprises a substantially different color.

18. A computer program product embodied in a non-transitory computer-readable medium and comprising computer instructions for:
receiving an input, the input indicating presenting text visually distinct based on one or more differences in formatting associated with the text,
wherein all the text with on one or more differences in formatting associated with the text is within a same document;
evaluating the document, the text being formatted according to one or more font attributes, the one or more differences being associated with the one or more font attributes; and
identifying the one or more differences, wherein the one or more differences are displayed in the document by applying one or more backgrounds associated with each of the one or more font attributes to the text.

* * * * *